(12) United States Patent
Goede et al.

(10) Patent No.: US 12,589,674 B2
(45) Date of Patent: Mar. 31, 2026

(54) POWER SUPPLY SYSTEM

(71) Applicant: Munich Electrification GmbH, Munich (DE)

(72) Inventors: Stefan Goede, Munich (DE); Marcos Gonzalez, Munich (DE); Martin Nimbach, Lucca (IT)

(73) Assignee: Munich Electrification GmbH, Munich (DE)

( * ) Notice: Subject to any disclaimer, the term of this patent is extended or adjusted under 35 U.S.C. 154(b) by 0 days.

(21) Appl. No.: 18/851,548

(22) PCT Filed: Mar. 31, 2023

(86) PCT No.: PCT/EP2023/058445
§ 371 (c)(1),
(2) Date: Sep. 26, 2024

(87) PCT Pub. No.: WO2023/194218
PCT Pub. Date: Oct. 12, 2023

(65) Prior Publication Data
US 2025/0162455 A1 May 22, 2025

(30) Foreign Application Priority Data
Apr. 6, 2022 (EP) ..................................... 22166942

(51) Int. Cl.
B60L 58/18 (2019.01)
B60L 1/00 (2006.01)
(Continued)

(52) U.S. Cl.
CPC ................. B60L 58/18 (2019.02); B60L 1/00 (2013.01); B60L 50/60 (2019.02);
(Continued)

(58) Field of Classification Search
CPC ...... B60L 58/18; B60L 50/60; B60L 2220/20; H01M 50/249; H01M 50/51
(Continued)

(56) References Cited

U.S. PATENT DOCUMENTS 6,154,381 A 11/2000 Kajouke et al.
2009/0317696 A1* 12/2009 Chang ................. H01M 10/052
429/61

(Continued)

FOREIGN PATENT DOCUMENTS

DE 102014216470 A1 2/2016
JP 2004007950 A 1/2004
(Continued)

OTHER PUBLICATIONS

Japanese Patent Office Action for Application No. 2024-559038 dated Feb. 25, 2025 (12 pages including English machine translation).

(Continued)

*Primary Examiner* — Rexford N Barnie
*Assistant Examiner* — Swarna N Chowdhuri
(74) *Attorney, Agent, or Firm* — Michael Best & Friedrich LLP

(57) ABSTRACT

The present disclosure relates to a power supply system (100), which comprises a high voltage battery pack (110) comprising a plurality of battery modules (102), which are electrically connected in series to form the high voltage battery pack (110), which is configured to output a predetermined high voltage as a sum of module voltages provided by the plurality of battery modules (102). The power supply system (100) further comprises a low voltage output terminal (116*a*, 116*b*), which is configured to output a predetermined low voltage to at least one electric load, and a voltage converter network (106), which is configured to electrically (Continued)

100 insulate the low voltage output terminal (116*a*, 116*b*) from the high voltage battery pack (110) and to convert at least a part of the module voltages into the predetermined low voltage. The voltage converter network (106) comprises at least one voltage converter (108), which is electrically connected to at least one of the plurality of battery modules (102) and is configured to convert the module voltage provided by the at least one of the plurality of battery modules (102) into the predetermined low voltage and to output the predetermined low voltage as an output voltage to the low voltage output terminal (116*a*, 116*b*), and a controller, which is configured to control an operation of the at least one voltage converter.

12 Claims, 3 Drawing Sheets

(51) Int. Cl.
| | |
|---|---|
| *B60L 50/60* | (2019.01) |
| *H01M 10/42* | (2006.01) |
| *H01M 50/204* | (2021.01) |
| *H01M 50/249* | (2021.01) |
| *H01M 50/51* | (2021.01) |

(52) U.S. Cl.
CPC ....... *H01M 10/425* (2013.01); *H01M 50/204* (2021.01); *H01M 50/249* (2021.01); *H01M 50/51* (2021.01); *B60L 2210/10* (2013.01); *H01M 2010/4271* (2013.01); *H01M 2220/20* (2013.01)

(58) Field of Classification Search
USPC ....................................................... 307/10.1
See application file for complete search history.

(56) References Cited

U.S. PATENT DOCUMENTS

| | | | | |
|---|---|---|---|---|
| 2010/0117593 | A1 | 5/2010 | Piccard et al. | |
| 2013/0300371 | A1* | 11/2013 | Bills ................... | H02J 7/0016 |
| | | | | 320/134 |
| 2014/0117938 | A1* | 5/2014 | Ouzaarou ............. | H02J 7/0019 |
| | | | | 320/134 |
| 2014/0312685 | A1 | 10/2014 | Moga | |
| 2015/0357692 | A1* | 12/2015 | Piggott ................. | H02J 7/0068 |
| | | | | 29/623.2 |
| 2016/0311328 | A1 | 10/2016 | Kim et al. | |
| 2017/0214252 | A1 | 7/2017 | Preindl et al. | |
| 2018/0050597 | A1* | 2/2018 | Hand, III .............. | H02J 7/0018 |
| 2018/0050603 | A1 | 2/2018 | Hand, III et al. | |

FOREIGN PATENT DOCUMENTS

| | | | |
|---|---|---|---|
| JP | 2014519803 | A | 8/2014 |
| JP | 2015220813 | A | 12/2015 |
| JP | 2016208832 | A | 12/2016 |
| JP | 2017500837 | A | 1/2017 |
| JP | 2021151122 | A | 9/2021 |
| JP | 2022516914 | A | 3/2022 |
| JP | 2022150120 | A | 10/2022 |
| KR | 1020160125285 | A | 10/2016 |
| KR | 1020190143650 | A | 12/2019 |
| WO | 2016114116 | A1 | 7/2016 |
| WO | 2021010113 | A1 | 1/2021 |

OTHER PUBLICATIONS

International Search Report and Written Opinion for Application No. PCT/EP2023/058445 dated Jun. 23, 2023 (12 pages).
European Patent Office European Srach Report for Application No. 22166942.7, dated Sep. 16, 2022 (9 pages).
Korean Patent Office Action for Application No. 1020247034880 dated Feb. 3, 2025 (8 pages including English machine translation).
Korean Patent Office Action for Application No. 1020247034880 dated Aug. 20, 2025 (11 pages including English machine translation).
Japanese Patent Office Action for Application No. 2024-559038 dated Jun. 24, 2025 (17 pages including English machine translation).

\* cited by examiner

<u>100</u>

POWER SUPPLY SYSTEM

The present disclosure relates to a power supply system, which is capable of outputting a predetermined high voltage to an electric load like an electric motor of an electric vehicle and of outputting a predetermined low voltage to another electric load.

With the advanced development of electric vehicles, in particular battery electric vehicles (BEV), hybrid electric vehicles (HEV), and plug-in hybrid electric vehicles (PHEV), high voltage battery packs become more and more common in vehicles like buses, trucks or passenger cars. Typically, high voltage battery packs used in electric vehicles comprise 80 to 300 battery cells connected in series and are used for powering the high voltage system of the electric vehicle, for example including the electric motor, hereby supplying high voltages in a range between 400 V and 1000 V. In future applications, even higher voltages may be supplied by the high voltage battery packs.

In addition to the high voltage battery pack, commonly a low voltage auxiliary battery, which provides a low voltage of 12V or 24V, is connected to a low voltage bus. The low voltage auxiliary battery serves as energy reservoir for powering electric loads such as an air conditioning or a lighting system of the vehicle.

As for example shown in FIG. 1, for this purpose an auxiliary battery 10 is loaded through a DCDC voltage converter 20, which is electrically connected to high voltage bus 30. The high voltage bus 30 is electrically connected to terminals of the high voltage battery 40, and is supplied with the high voltage provided by the high voltage battery 40. Contactors 50a and 50b, which can be opened to interrupt the power supply of the high voltage bus 30, for example when the electric vehicle is turned off or a high voltage short-circuit occurs are arranged between the terminals of the high voltage battery 40 and the DCDC voltage converter 20. Accordingly, the auxiliary battery 10 does not only balance load and demand on a low voltage bus 60, which is electrically connected to the auxiliary battery 10, but also acts as an energy reservoir for the electric loads connected to the low voltage bus 60, when the electrical vehicle is turned off.

However, the inventors of the present invention have found that due to the high input voltage provided by the high voltage battery pack, and the high output current provided to the loads supplied by the low voltage bus, the components of the DCDC converter experience a large amount of stress and consequently are susceptible to an high amount of deterioration. Furthermore, the common auxiliary batteries used in the conventional system are expensive, heavy and need a huge amount of space in a safe location inside the vehicle.

Accordingly, there is a need to overcome this disadvantages and to provide a power supply system with a simplified structure, which allows applying less stress on the circuit components of the power supply system. It is a further object to provide a space-saving and cost-efficient solution.

At least one of these objects is solved by the present invention as claimed in the independent claim.

In particular, according to an aspect of the present disclosure, there is provided a power supply system, which comprises a high voltage battery pack comprising a plurality of battery modules, which are electrically connected in series to form the high voltage battery pack, which is configured to output a predetermined high voltage as a sum of module voltages provided by the plurality of battery modules, a low voltage output terminal, which is configured to output a predetermined low voltage to at least one electric load, and a voltage converter network, which is configured to electrically insulate the low voltage output terminal from the high voltage battery pack and to convert at least a part of the module voltages into the predetermined low voltage. The voltage converter network comprises at least one voltage converter, which is electrically connected to at least one of the plurality of battery modules and is configured to convert the module voltage provided by the at least one of the plurality of battery modules into the predetermined low voltage and to output the predetermined low voltage as an output voltage to the low voltage output terminal, and a controller, which is configured to control an operation of the at least one voltage converter.

In other words, the present disclosure is based on the idea to directly connect a voltage converter to a battery module of the high voltage battery, i.e. to a part of the high voltage battery, so that an input voltage provided to the voltage converter is reduced to a fraction of the predetermined high voltage, which is supplied by the high voltage battery pack. In this manner, the required voltage transformation ratio of the voltage converter and the voltage stress applied on the input semiconductors of the voltage converter can be reduced significantly.

Furthermore, the at least one voltage converter is electrically connected directly to connection nodes of at least one of the battery modules of the high voltage battery, and not necessarily to a high voltage bus of the power supply system. Consequently, the specific configuration of the disclosed power supply system eliminates the need for storing energy in an auxiliary battery connected to the low voltage bus of an electric vehicle, since power flow from the input side to the output side is possible through the converter network, even when contactors provided in the high voltage bus are open. Accordingly, the need for providing a heavy auxiliary battery in the power supply system for storing energy can be dispensed.

In an advantageous aspect of the present disclosure, the voltage converter network comprises a plurality of voltage converters, wherein each of the plurality of voltage converters is electrically connected to at least one of the plurality of battery modules and is configured to convert the module voltage provided by the at least one of the plurality of battery modules into the predetermined low voltage and to output the predetermined low voltage as the output voltage to the low voltage terminal.

In other words, the present disclosure provides a highly redundant network of voltage converters, which are electrically connected to individual battery modules of the high voltage battery pack. This distributed configuration of the voltage converter network offers a higher efficiency in voltage conversion, reduces design complexity, and provides significant volume and weight reduction compared to a case where a single auxiliary battery is used as an energy source for a low voltage bus of an electric vehicle.

Preferably, the plurality of voltage converters are connected in parallel to each other in the voltage converter network. In this manner, the plurality of voltage converters can act as independent low voltage power sources for the electrical loads, which are electrically connected to the low voltage terminal of the power supply system. This parallelized structure allows operation of the power supply system even if one or more of the voltage converters fail. Accordingly, continuous power supply for safety-critical electric loads, which are electrically connected to the low voltage terminal, can be ensured.

In another advantageous aspect of the present disclosure each of the plurality of voltage converters is electrically connected to the same number of battery modules. In this manner, it can be ensured that each of the voltage converters experiences a same input voltage, i.e. a multiple of the module voltage. Preferably, the number of battery modules, to which each of the plurality of voltage converters is electrically connected is one, so that the input voltage can be decreased to the module voltage of one battery module. For example, if n battery modules are electrically connected in series to form the high voltage battery pack, the module voltage may be given as (HV/n), wherein HV describes the predetermined high voltage of the high voltage battery pack. In this scenario each voltage converter can experience a reduction of a factor n of the input voltage compared to the conventional case, where the complete high voltage HV of the battery pack is used as the input voltage for a single voltage converter.

In order to allow a quick reply of the voltage converters to load requirements of the electric loads electrically connected to the low voltage output terminal and being supplied by the voltage converter network, each of the at least one voltage converters can comprise a measurement circuit, which is configured to measure an actual output voltage of the voltage converter, and a microcontroller, which is configured to regulate the output voltage of the voltage converter based on the measured actual output voltage.

For allowing a centralized control of the load management of the plurality of voltage converters, each of the at least one voltage converters preferably comprises a communication circuit, which is configured to communicate the measured actual output voltage to the controller of the voltage converter network.

In another advantageous aspect of the present disclosure, the controller of the voltage converter network is configured to activate or deactivate each one of the at least one voltage converters. Hereby, the controller may preferably activate or deactivate each one of the plurality of voltage converters based on an overall load electrically connected to the low voltage output terminal and/or based on a state of charge of the at least one battery module, to which the respective voltage converter is connected. In this manner, the present disclosure can enable a rapid response on power demand scenarios of the electric loads electrically connected to the low voltage output terminal and being supplied by the voltage converter network. In addition, this configuration allows balancing of the module voltages of the battery modules on a module level without dissipating energy by the use of balancing resistors.

In another advantageous aspect of the present disclosure, each of the at least one voltage converters is mounted on a printed circuit board provided as a part of a battery management system of the high voltage battery pack. For example, each of the voltage converters may be placed on a charge monitoring board (CMB), which already is provided in a battery management system of the battery for monitoring the charge and/or temperature of one (or more) of the plurality of battery modules. In this manner, the present disclosure allows to use the already existing communication lines in each CMB, for providing communication between the plurality of voltage converters and the controller of the voltage converter.

In another advantageous aspect of the present disclosure, the voltage converter network is configured to generate an excitation signal for performing electrochemical impedance spectroscopy of at least one of the plurality of battery modules. Since the current generated for performing the EIS electrochemical impedance spectroscopy (EIS) can be directly consumed by the electric loads, which are electrically connected to the low voltage output terminal and being supplied by the voltage converter network, the power loss of a switched resistance used in conventional EIS can be avoided. Furthermore, since the reactive electric components inside each of the voltage converter can generate a current sine wave with a low total harmonic distortion (THD) compared to the excitation signal generated in conventional methods, a data processing effort for analysing the result of the impedance measurement can be reduced and the accuracy of the impedance measurement can be enhanced.

For supplying the at least one electric load with the predetermined low voltage, the power supply system may further comprise a low voltage bus, which is configured to electrically connect the low voltage output terminal to the at least one electric load.

Optionally, in order to provide a further energy optimization the low voltage bus may advantageously comprise a first low voltage supply line and a second low voltage supply line, wherein the first low voltage supply line and the second low voltage supply line may optionally supply different classes of electric loads. Hereby, the classes of electric loads may sort the electronic components according to their energy demand and/or their function in view of safety.

In order to optimize the reduction of the required voltage transformation ratio of the at least one voltage converter of the voltage converter network and the voltage stress applied on the input semiconductors of the at least one voltage converter, the module voltages provided by each of the battery modules are in the range of 30 V to 60 V. In other words, the high voltage battery pack is divided in units of battery modules, which each provide module voltages in the range of 30 V to 60 V, and to which the voltage converter(s) of the voltage converter network can be electrically connected.

In a particular advantageous aspect of the present disclosure, the high voltage battery pack is a driving battery, which is configured to supply power to a motor of an electric vehicle. In such a use case, it is possible to substitute the low voltage auxiliary battery used as a low voltage power source in conventional electric vehicles by the voltage converter network, being connected directly to single battery modules of the high voltage battery.

Throughout this document, the term "high voltage" shall describe voltages in the range above 200 V and preferably in the range between 400 V and 1000 V, and the term "low voltage" shall describe voltages in the range between 0 V and 100 V, and preferably between 0 V and 50 V.

Furthermore, the term "terminal" shall describe a point at which a conductor from a power source, like a battery pack or a battery, an electric device, an electric circuit, an electric component or an electric load ends, and where a point is provided for electrically connecting a power source, an external electric device, an external electric circuit, an external electric component or an electric load to this conductor. The term "node" or "connection node" shall describe a point where the terminals of one or more circuit components meet or may refer to the entire wire, which conductively couples the terminals of one or more electric circuit components.

In the following, the invention is described in more detail with reference to the attached figures and drawings. Similar or corresponding details in the figures are marked with the same reference numerals.

The accompanying drawings are incorporated into the specification and form a part of the specification to illustrate several aspects of the present disclosure. These drawings, together with the description, serve to explain the principles of the invention. The drawings are merely for the purpose of illustrating the preferred and alternative examples of how the invention can be made and used, and are not to be construed as limiting the invention to only the illustrated and described aspects. Furthermore, several aspects may form-individually or in different combinations-solutions according to the present disclosure. The following described aspects can thus be considered either alone or in an arbitrary combination thereof. The described aspects are merely possible configurations, and it must be borne in mind that the individual features, as described above, can be provided independently of one another, or can be omitted altogether while implementing this invention. Further features and advantages will become apparent from the following, more particular description of the various aspects, as illustrated in the accompanying drawings, wherein:

Figure 1:
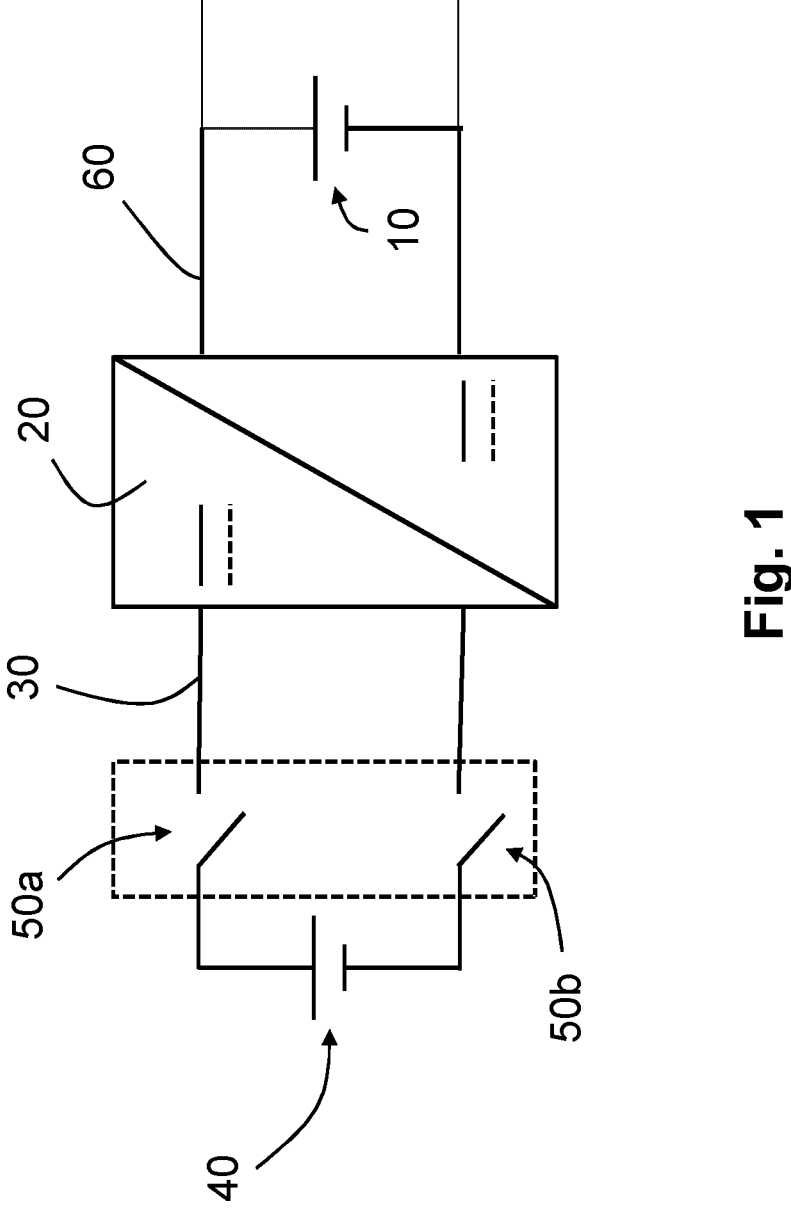
FIG. 1 shows a schematic diagram of a power supply system according to the prior art.
Figure 2:
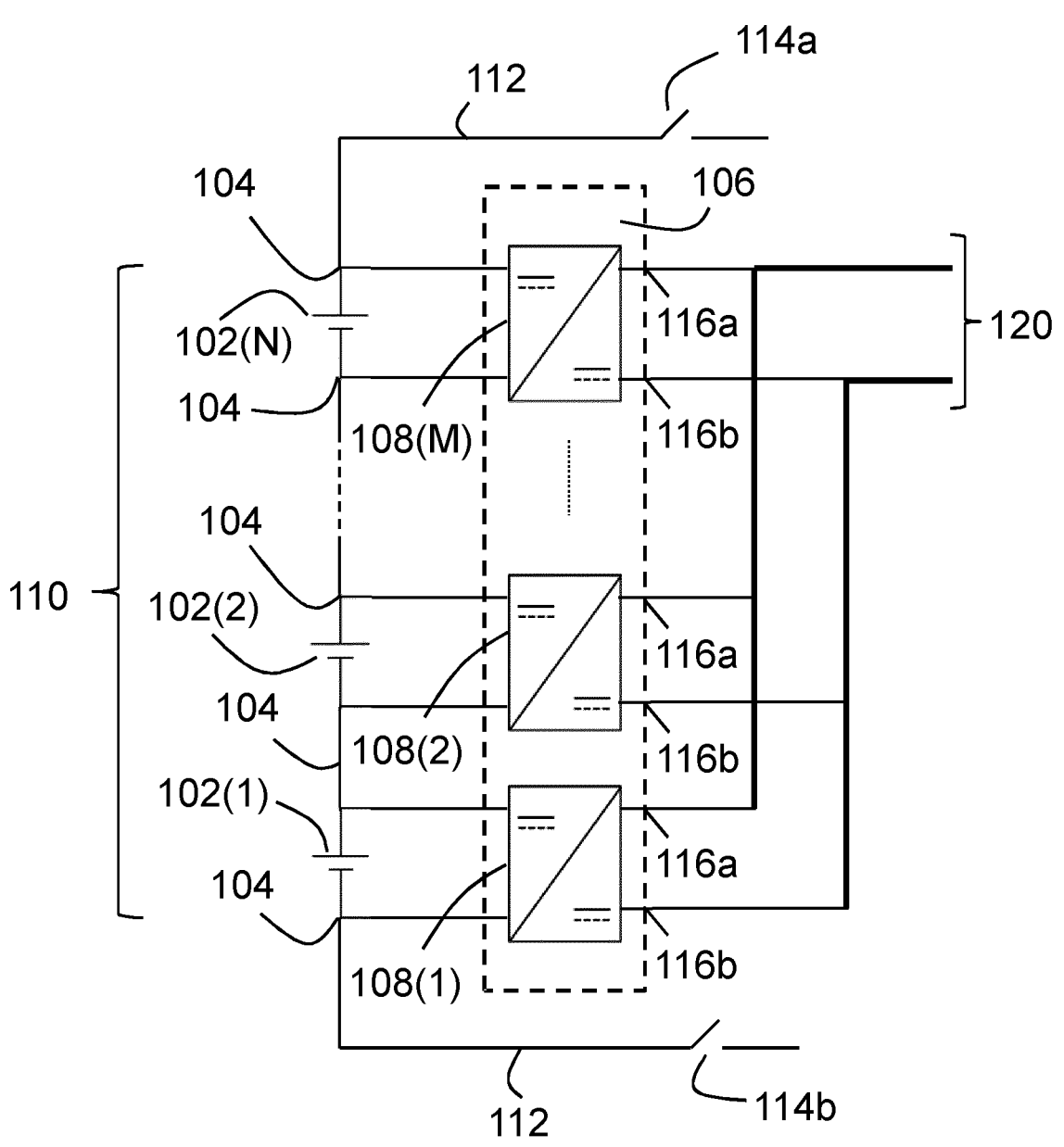
FIG. 2 shows a schematic diagram of a power supply system according to an aspect of the present disclosure.

The present disclosure will now be explained in more detail with reference to the Figures and firstly referring to FIG. 2. FIG. 2 is a schematic circuit diagram of a power supply system 100 that can benefit from the ideas of the present disclosure. In an application scenario exemplarily described in the following the power supply system 100 is used in an electric vehicle as a power supply for electric loads like an electric motor, which are supplied at a predetermined high voltage, and for electric loads like an air conditioning system or a lightning system, which are supplied at a predetermined low voltage. However, the power supply system 100 may also be used in other energy storage systems, where electric loads are supplied with different levels including at least one level of predetermined high voltage and at least one level of predetermined low voltage.

The power supply system 100 is provided with a high voltage battery pack 110 (throughout this document sometimes also signified as high voltage battery 110), which provides an energy storage for outputting a predetermined high voltage to a high voltage bus 112, which is electrically connected to a terminal of the battery pack 110 at a high potential side and a terminal of the battery pack 110 at a low potential side and may supply the electric motor of the vehicle with the predetermined high voltage. Contactors 114a and 114b are arranged on the high voltage bus 112. In this example, contactor 114a may be electrically connected to the terminal of the high voltage battery pack 110 at the high potential side and contactor 114b may be electrically connected to the terminal of the high voltage battery pack 110 at the low potential side. Contactors 114a and 114b may be opened or closed, for providing or interrupting power supply from the high voltage battery pack 110 to the electric motor through the high voltage bus 112.

The high voltage battery pack 110 comprises a plurality of battery modules 102, which are connected in series at connection nodes 104, so as to form the high voltage battery pack 110. To distinguish each of the number of N of battery modules 102, the numbers are specified in FIG. 2 as battery module 102(1), 102(2), . . . , 102(N), from the low potential side at the bottom to the high potential side at the top of the high voltage battery pack 110.

The battery modules 102 are subunits of the high voltage battery pack 110, thereby providing module voltages, which sum up to the predetermined high voltage output by the high voltage battery pack 110 to the high voltage bus 112. In other words, the value of the module voltage provided by each of the battery modules 102 can be obtained by dividing with N the predetermined high voltage value output from the high voltage battery pack 110, wherein N may be the number of battery modules 102. For example, when the battery pack 110 outputs a predetermined high voltage value of 800 V, and N=20, battery modules 102 share and output a module voltage of (800 V/20)=40V.

Each of the battery modules 102 comprises a plurality of battery cells electrically connected in series. Hereby, a battery cell may be a physical battery cell or may comprise several physical battery cells electrically connected in parallel on a cell level. Exemplarily, 12 to 14 battery cells each having a cell voltages in the range of 3.3 V to 4.3 V, may be electrically connected in series to form each of the battery modules 102. Accordingly, in this example each battery module 102 may provide a module voltage in the range between 30 V and 60 V. However, also a different number of battery cells with a different cell voltage may be electrically connected to form the battery modules 102, which then may provide a smaller or larger module voltage.

For supplying several electric loads with a predetermined low voltage, in addition to the predetermined high voltage supplied to the electric motor of the vehicle, the power supply system 100 comprises a voltage converter network 106, which is configured to convert at least a part of the module voltages provided by the battery modules 102 into the predetermined low voltage, which for example may be 12 V or 24 V. In addition, the voltage converter network 106 electrically insu-lates the high voltage battery pack 110 from a low voltage bus 120, which is configured to supply electric loads at the predetermined low voltage.

The voltage converter network 106 comprises voltage converters 108. To distinguish each of the number of M of voltage converters 108, the numbers are specified in FIG. 2 as voltage converters 108(1), 108(2), . . . , 108(M), from the low potential side at the bottom to the high potential side at the top of the high voltage battery pack 110.

As can be seen from FIG. 2, in the illustrated example the total number M of voltage converters 108 may be equal to the total number N of battery modules 102, so that each of the voltage converters 108 is electrically connected to the connection nodes 104 of one of the plurality of battery modules 102. Accordingly, each of the voltage converters 108 converts the module voltage of one of the plurality of battery modules 102 into the predetermined low voltage.

However, it is not essential that the total number M of voltage converters 108 of the voltage converter network 106 is equal to the total number N of battery modules 102 of the high voltage battery pack 110. For example, the number M may be smaller than the number N and each of the voltage converters 108 may be electrically connected to more than one of the battery modules 102 and accordingly convert an input voltage, which is a sum of a part of the module voltages. Preferably hereby, each of the voltage converters 106 is electrically connected to the same number of battery modules 102 in order to achieve an equalization of the input voltage of the voltage converters 108. This simplifies the control of the voltage converters 108 described later on. Furthermore, it is noted that not all of the N battery modules 102 may necessarily be connected to one of the voltage converters 108.

For example, the voltage converter network 106 may comprise one voltage converter 108, which is electrically connected to one of the battery modules 102 or to more than one of the battery modules 102. In another example, the voltage converter network 106 may comprise two voltage converters 108, which are electrically connected to two different battery modules 102, while the other N–2 battery modules 102 are not electrically connected to a voltage converter.

As described above, the module voltage of one of the battery modules 102 only amounts to a fraction of the predetermined high voltage output by the high voltage battery pack 110. Accordingly, electrically connecting each of the voltage converter 108 to one or only a part of the plurality of battery modules 102 significantly reduces the input voltage applied to the voltage converters 108 and accordingly allows to cut down the voltage transformation ratio of the voltage converters 108 and the voltage stress applied on the input semiconductors of the voltage converters 108.

As can be seen from FIG. 2, in the voltage converter network 106 the voltage converters 108 are electrically connected in parallel to each other, so as to serve as parallelized power sources for the low voltage bus 120, which is electrically connected to the voltage converter network 106 at the low voltage terminals 116a and 116b (also signified as low voltage output terminals 116a and 116b). Low voltage terminals 116a and 116b output the predetermined low voltage from the voltage converters 108 to the low voltage bus 120. While in this example each of the voltage converters 108 has its own respective low voltage output terminals 116a and 116b, the voltage converters 108 of the voltage converter network 106 may also be electrically connected to a common low voltage terminal 116a of the power supply system 100, which can be electrically connected to the high potential side of the low voltage bus 120. In addition, the voltage converters 108 of the voltage converter network 106 may also be electrically connected to a common low voltage terminal 116b of the power supply system 100, which can be electrically connected to the high potential side of the low voltage bus 120. The parallelized structure of providing several different voltage converters 108 as power sources for the predetermined low voltage, provides high redundancy for supplying the low voltage bus 120 with the predetermined low voltage even if one or more of the voltage converters 108 fails.

Optionally, the low voltage bus 120 may comprise two low voltage supply lines, which electrically connect different electric loads to the low voltage output terminals 116a and 116b. In this manner, for example, the low voltage bus 120 may be divided in a first low voltage bus, which supplies the predetermined low voltage to electric loads through a first low voltage supply line and a second low voltage bus, which supplies the predetermined low voltage to electric loads, through a second low voltage supply line. The first low voltage supply line may for example supply those electrical loads, which are not critical for the operation of the electric vehicle (or the energy storage system, which uses the power supply system 100), i.e. non-critical loads. The second low voltage supply line may for example supply those loads, which are critical for the operation of the electric vehicle (or the energy storage system, which uses the power supply system 100), i.e. safety-critical loads. The non-critical loads may include for example loads such as an air conditioning system, a heating system, one or more infotainment systems, USB charging points, or an interior lighting system.

The safety-critical loads may include for example loads such as lighting systems, airbags, or ADAS systems.

For ensuring the safety of the power supply optionally one of the first and second low voltage supply lines may be electrically connected a low voltage battery, which can store the predetermined low voltage, which is output by the voltage converter network 106. Since, the first and the second low voltage bus only need to supply a fraction of all the electric loads compared to the conventional power supply system, such a low voltage battery can have a much smaller capacitance and size than the conventional auxiliary battery of a vehicle power supply system.

Besides the differentiation in critical loads and non-critical loads, the electric loads, which are supplied by the power supply system 100 may be, alternatively or in addition, differentiated in classes according to their power consumption. For example, the first low voltage bus may supply the predetermined low voltage to those electrical loads, whose current consumption is above a predetermined threshold, and the second low voltage bus may supply the predetermined low voltage to those electrical loads, whose current consumption is below a predetermined threshold.

To convert the module voltages into the predetermined low voltage, DC-DC converters are used as the voltage converters 108. As an example topology for the implementation of each DC-DC converter a full bridge phase shift converter may be used. Such converters are used frequently in step-down, isolated, medium to high power applications. The full bridge phase shift converter utilizes four electric switches, for example in form of MOSFET switches or Insulated-gate bipolar transistors (IGBTs) to form a full bridge input, and to generate a 50% duty cycle in each of its bridge legs. The power transfer from the input side (primary side) to the output side (secondary side) of the full bridge phase shift converter can be controlled by phase shifting the two signals. A high frequency transformer provides isolation between the primary side and the secondary side and accordingly can provide galvanic isolation between the high voltage battery pack 110, which is at least partly electrically connected to the input side of each voltage converter 108, and the low voltage bus 120, which is connected through the low voltage output terminals 116a and 116b to the output side of the voltage converter 108.

By its design, the phase-shift topology of the full bridge phase shift converter enables zero voltage switching of the switches in at least one bridge leg of the half bridge, thus resulting in low switching losses and an efficient power conversion. On the secondary side of the full bridge phase shift converter, active or passive rectifying may be used. Switch-based active rectifying enables higher efficiency and bidirectional conversion of the voltage, while diode based passive rectifying reduces cost and design complexity.

A magnetic transformer is an important part of the full bridge phase shift converter design, and may comprise a planar transformer integrated in a printed circuit board of the full bridge phase shift converter. Hereby, the magnetic part may be integrated inside the printed circuit board by utilizing printed traces along the layer stack-up of the printed circuit board to create the magnetic turns. The magnetic core of the transformer may by integrated by slotting appropriately the PCB. With such a design of the voltage converter 108, it is possible to provide high frequency operation while minimizing leakage inductance and AC losses.

For optimizing the load management in the voltage converter network 106, the voltage converter network 106 comprises at least one controller, which controls the operation of the at least one voltage converter 108.

In a case where the voltage converter network 106 comprises a single voltage converter 108, this controller may be a microcontroller of the single voltage converter 108, which for example regulates the output voltage of the single voltage converter 108 based on an actual output voltage of the single voltage converter 108. For example, different transformer ratios may be used in the single voltage converter 108 to step down the voltage dependent on the momentary power need.

The actual output voltage of the single voltage converter 108 may for example be measured by a measurement circuit of the single voltage converter 108. In this manner, the microcontroller can for example ensure that the actual output voltage of the single voltage converter 108 can droop in accordance with the load supplied to the electronic components electrically connected to the low voltage bus 120.

In a case where the voltage converter network 106 comprises more than one voltage converter 108, each of the voltage converter 108 may comprise a microcontroller, which regulates the output voltage of the voltage converter 108 based on an actual output voltage of the single voltage converter 108 as a primary control circuit. The actual output voltage of the individual voltage converters 108 may, for example, be regulated by adapting a voltage transformation ratio of the voltage converter 108. For example, different transformer ratios may be used in the individual voltage converters 108 to step down the voltage dependent on the momentary power need.

Also in this case, the actual output voltage of the voltage converter 108 may for example be measured by a measurement circuit of the single voltage converter 108. The actual output voltage of each voltage converter 108 may for example be measured by a measurement circuit of each voltage converter 108. In this manner, it can be ensured that the actual output voltage of each voltage converter 108 can droop in accordance with the load supplied to the electronic components electrically connected to the low voltage bus 120. In this manner, the individual voltage converters 108 behave like a virtual resistances, and the actual output characteristic of the voltage converters 108 can be adapted to the load required by the low voltage bus 120, while the required load can be distributed across the individual voltage converters 108. Accordingly, with this technique fast transient response to a change in the load requirements and a good stability of power supply in the low voltage bus 120 can be achieved.

However, in this case, the voltage converter network 106 further comprises a central controller, which may be also signified as a control unit, for controlling the operation of the plurality of voltage converters 108, as a secondary control. This central controller may be for example the microcontroller of the battery management system of the high voltage battery pack 110, may be a dedicated controller provided for the voltage converter network 106 in communication with a vehicle ECU (Engine Control Unit), which controls the operation of the high voltage battery pack 110 (for example a battery ECU), or may be a vehicle ECU. The central controller is connected to the microcontroller of each voltage converter 108 by communication lines and can activate or deactivate each of the voltage converters 108 based on the load requirements in the low voltage bus 120. For example, if a large load is supplied by the low voltage bus 120, the central controller may enhance the number of active voltage converters 108 in the voltage converter network 106, and if a small load is supplied by the low voltage bus 120, the central controller may reduce the number of active voltage converters 108 in the voltage converter network 106.

Similar, the central controller may use each of the voltage converters 108 for performing balancing of the charge of the battery modules 102. In this case, the central controller may activate and deactivate each of the voltage converters 108 based on the state of charge (SOC) or voltage of the battery module 102, to which the respective voltage converter 108 is electrically connected. For example, if the central controller determines that the SOC or the voltage of one of the plurality of battery modules 102 is higher than the SOC or the voltage of the other battery modules 102, the central controller may activate the voltage converters 108 electrically connected to the one battery module 102, and may de-activate the other voltage converters 108 of the voltage converter network 106, so that the excessive SOC or voltage can be discharged through the low voltage bus 120. In this manner, balancing of the SOC or voltages of the plurality of battery modules 102 can be performed by powering the electric loads electrically connected to the low voltage bus 120, so that it is not necessary to waste energy by consuming load with a balancing resistor.

Figure 3:
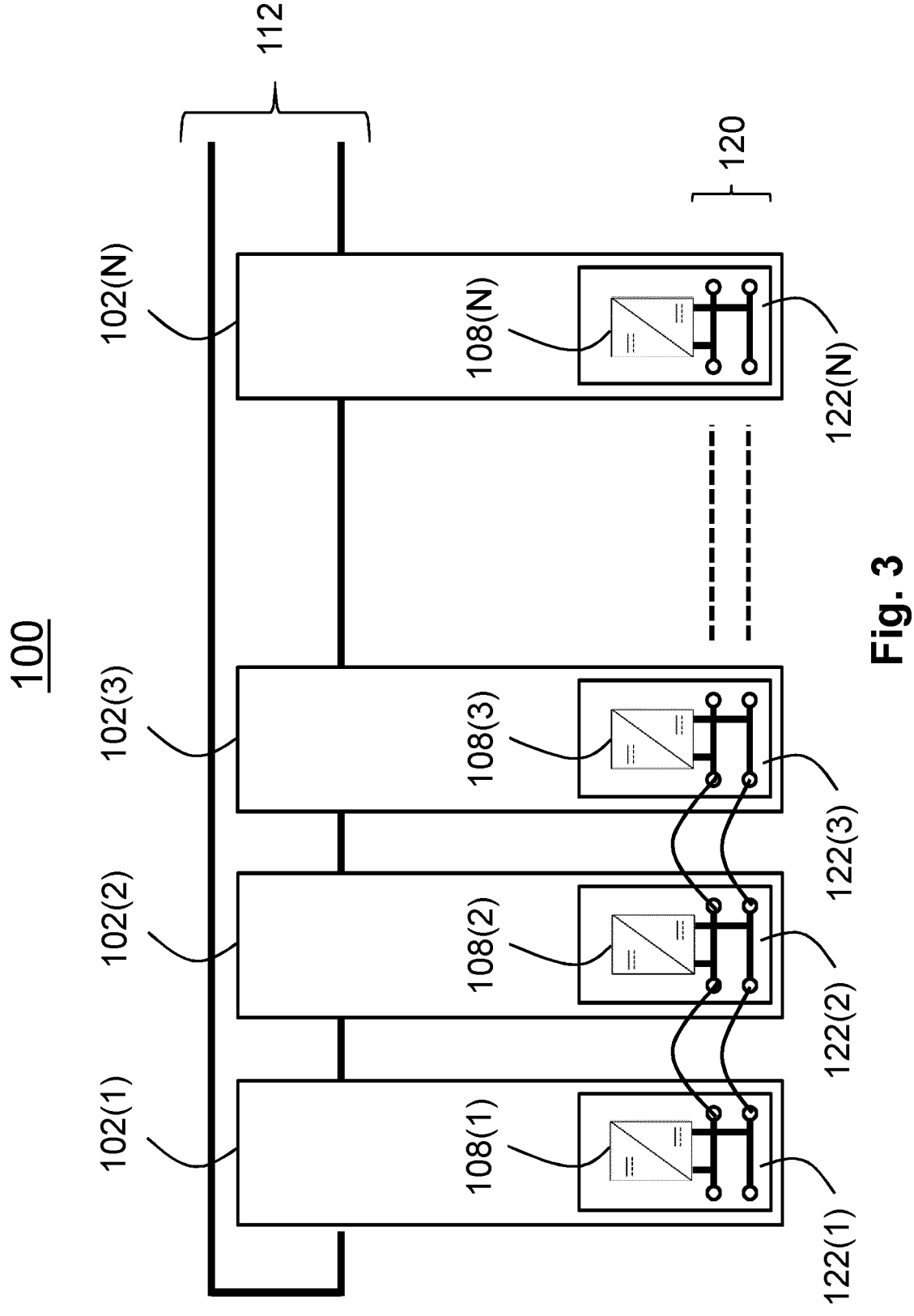
FIG. 3 shows another schematic diagram of the power supply system according to another aspect of the present disclosure.

In another advantageous aspect, schematically shown in FIG. 3, the voltage converters 108 of the voltage converter network 106 may be placed on charge monitoring boards 122, which comprise one or more integrated circuits (cell monitoring ICs) for monitoring a charge of one or more of the plurality of battery module 102(1) to 102(N), to which the charge monitoring boards 122 are attached. The charge monitoring boards 122, may be provided in the form of printed circuit boards, on which the one or more cell monitoring ICs and other peripheral circuits, like a communication interface for enabling communication between the respective cell monitoring ICs and an external controller, for example a main control circuit of the battery management system, are provided. As shown in FIG. 3 preferably one charge monitoring board 122(1), 122(2), . . . , 122(N) is attached to each of the battery modules 102(1), 102(2), . . . , 102(N).

In other words, in this aspect, the present disclosure provides a charge monitoring board 122 with an integrated voltage converter 108, which converts the module voltage of the battery module 102, to which the respective charge monitoring board 122 is attached, into the predetermined low voltage, so that each charge monitoring board 122 can serve as a power supply for the low voltage bus 120, electrically connected to the low voltage terminals 116a and 116b. In this manner, it is possible that the voltage converters 108 can share the already existing communication lines of the charge monitoring boards 122, on which they are placed, for example when communicating with the central controller of the voltage converter network 106. Accordingly, each of the charge monitoring boards having integrated a voltage converter can benefit from the advantages of the present disclosure described so far, while providing a highly integrated design and minimizing cost and design effort.

In another aspect of the present disclosure, the voltage converter network 106 is operated to generate an excitation signal for performing Electrochemical Impedance Spectroscopy (also known as EIS) of at least one of the plurality of battery modules 102 or of the high voltage battery 110 as a whole.

Electrochemical Impedance Spectroscopy, also known as EIS, is based on a safe perturbation technique, which allows to model the electrochemical process inside the high voltage battery pack 110 or a subunit of the high voltage battery pack 110, for example a certain number of battery modules 102. This is achieved by exciting the high voltage battery pack 110 or a part of the battery modules 102 with excitation currents having different frequencies and determining an impedance response of the high voltage battery 110 or the part of the battery modules 102. In this manner, a deterioration of the high voltage battery 110 or the part of the battery modules 102 can be determined, since an increase of the impedance is directly proportional to a declining of the capacitance of the high voltage battery pack 110 or the part of the battery modules 102 due to aging. Accordingly, analysing the impedance response as a function of frequency by using EIS, allows to study the state of health (SOH) of the high voltage battery pack 110.

Performing online EIS in the power supply system 100 allows to monitor the SOH of the high voltage battery pack 110 over the lifetime of the electric vehicle. In conventional power supply systems additional hardware is needed to generate a current excitation signal as perturbation signal. Furthermore, if the existing electric components for voltage measurement of the CMB should be used, high excitation currents are necessary, so that a resulting voltage perturbation can be measured with sufficient accuracy. In general, online EIS methods typically use a switched resistive load to generate the current excitation signal. Hereby, usually, a sinusoidal modulation signal is applied to the switch, for example generated by using pulse width modulation. By varying the frequency of the modulation signal, the impedance response can be measured as a function of the frequency. However, the conventional technique produces high current ripple, and consequently results in extensive data processing effort to remove the high frequency noise coming from the switching current components.

This disadvantage can be overcome by using the specific configuration of the power supply system 100. In particular, the power supply system 100 includes the voltage converter network 106, which comprises the voltage converters 108, so as to serve as parallelized power sources for the low voltage bus 120. However, in addition each voltage converter 108 may individually be used to generate the current excitation signal for performing EIS of one or more of the battery modules 102 or of the high voltage battery pack 110 as a whole.

By using the voltage converters 108 for generating the current excitation signal, the reactive components of the voltage converters 108 allow to generate a sinusoidal current sine wave with low total harmonic distortion (THD) as excitation signal (or perturbation signal). Thus, the data processing effort for determining the impedance response can be reduced and the overall accuracy of the impedance measurement can be increased. Additionally, since the existing voltage converters 108 are used, no extra hardware is necessary and the energy used during the EIS can be consumed by the electric loads electrically connected to the low voltage bus 120, instead of burning it into a resistor.

| REFERENCE NUMERALS | |
| --- | --- |
| 10 | auxiliary battery |
| 20 | DCDC voltage converter |
| 30 | high voltage bus |
| 40 | high voltage battery |
| 50a, 50b | contactor |
| 60 | low voltage bus |
| 100 | power supply system |
| 102 | battery modules |
| 104 | connection node |

-continued

| REFERENCE NUMERALS | |
| --- | --- |
| 106 | voltage converter network |
| 108 | voltage converter |
| 110 | high voltage battery pack |
| 112 | high voltage bus |
| 114a, 114b | contactor |
| 116a, 116b | low voltage terminal |
| 120 | low voltage bus |
| 122 | charge monitoring boar |

The invention claimed is:

1. A power supply system (100) comprising:
a high voltage battery pack (110) comprising a plurality of battery modules (102), which are electrically connected in series to form the high voltage battery pack (110), which is configured to output a predetermined high voltage as a sum of module voltages provided by the plurality of battery modules (102);
a low voltage output terminal (116a, 116b), which is configured to output a predetermined low voltage to at least one electric load; and
a voltage converter network (106), which is configured to electrically insulate the low voltage output terminal (116a, 116b) from the high voltage battery pack (110) and to convert at least a part of the module voltages into the predetermined low voltage;
wherein the voltage converter network (106) comprises a plurality of voltage converters (108), wherein
each of the plurality of voltage converters (108) is electrically connected to at least one of the plurality of battery modules (102) and is configured to convert the module voltage provided by the at least one of the plurality of battery modules (102) into the predetermined low voltage and to output the predetermined low voltage as an output voltage to the low voltage output terminal (116a, 116b); and
a controller, which is configured to control an operation of the plurality of voltage converters, wherein the controller is configured to activate or deactivate each one of the plurality of voltage converters (108), and
wherein each of the plurality of voltage converters (108) comprises a measurement circuit, which is configured to measure an actual output voltage of the voltage converter (108), and a microcontroller, which is configured to regulate the output voltage of the voltage converter (108) based on the measured actual output voltage, and
wherein the controller is configured to activate or deactivate each one of the plurality of voltage converters (108) based on an overall load electrically connected to the low voltage output terminal (116a, 116b), so as to respectively enhance or reduce the number of active voltage converters (108) in the voltage converter network (106).

2. The power supply system (100) according to claim 1, wherein the plurality of voltage converters (108) are connected in parallel to each other in the voltage converter network (106).

3. The power supply system (100) according to claim 1, wherein each of the plurality of voltage converters (108) is electrically connected to a same number of battery modules (102).

4. The power supply system (100) according to claim 3, wherein the same number of battery modules (102) is one.

5. The power supply system (100) according to claim 1, wherein each of the plurality of voltage converters (108) comprises a communication circuit, which is configured to communicate the measured actual output voltage to the controller of the voltage converter network (106).

6. The power supply system (100) according to claim 5, wherein the controller is configured to activate or deactivate each one of the plurality of voltage converters (108) based on a state of charge of the at least one battery module (102), to which the respective voltage converter (108) is electrically connected.

7. The power supply system (100) according to claim 1, wherein each of the plurality of voltage converters (108) is mounted on a printed circuit board (122) provided as a part of a battery management system of the high voltage battery pack (110).

8. The power supply system (100) according claim 1, wherein the voltage converter network (106) is configured to generate an excitation signal for performing electrochemical impedance spectroscopy of at least one of the plurality of battery modules (102).

9. The power supply system (100) according to claim 1, further comprising a low voltage bus (120), which is configured to electrically connect the low voltage output terminal (116*a*, 116*b*) to the at least one electric load.

10. The power supply system (100) according to claim 9, wherein the low voltage bus (120) comprises a first low voltage supply line and a second low voltage supply line, and wherein optionally the first low voltage supply line and the second low voltage supply line supply different classes of electric loads.

11. The power supply system (100) according to claim 1, wherein the module voltages are in the range of 30 V to 60 V.

12. The power supply system according to claim 1, wherein the high voltage battery pack (110) is a driving battery, which is configured to supply power to a motor of an electric vehicle.

* * * * *